(12) United States Patent
Brassfield et al.

(10) Patent No.: US 6,382,906 B1
(45) Date of Patent: May 7, 2002

(54) FLOATING SPOOLIE CUP IMPINGEMENT BAFFLE

(75) Inventors: Steven Robert Brassfield, Cincinnati; Judd Dodge Tressler, Mason; Alan Lionel Webb, Hamilton, all of OH (US)

(73) Assignee: General Electric Company, Cincinnati, OH (US)

( * ) Notice: Subject to any disclaimer, the term of this patent is extended or adjusted under 35 U.S.C. 154(b) by 80 days.

(21) Appl. No.: 09/595,867

(22) Filed: Jun. 16, 2000

(51) Int. Cl.$^7$ ................................................ F01D 5/14
(52) U.S. Cl. ........................................................ 415/115
(58) Field of Search ................................. 415/115, 116; 416/97 R, 97 A

(56) References Cited

U.S. PATENT DOCUMENTS

| | | | | |
|---|---|---|---|---|
| 3,540,810 A | * | 11/1970 | Kercher | 416/96 A |
| 4,288,201 A | * | 9/1981 | Wilson | 415/115 |
| 5,795,128 A | * | 8/1998 | Eichstadt | 415/115 |
| 6,158,955 A | * | 12/2000 | Caddell, Jr. et al. | 415/416 |

* cited by examiner

Primary Examiner—John Kwon
(74) Attorney, Agent, or Firm—Andrew C. Hess; Rodney M. Young

(57) ABSTRACT

An impingement baffle for a turbine nozzle vane includes a perforate sleeve for discharging impingement air therethrough. A cap closes the sleeve at a top end, and includes an inlet hole. A spoolie cup includes a flange at the bottom thereof which is disposed atop the cap around the inlet hole for channeling air therein. A retainer is joined to the cap to loosely trap the cup flange thereatop for permitting limited lateral sliding movement thereof.

19 Claims, 3 Drawing Sheets

FLOATING SPOOLIE CUP IMPINGEMENT BAFFLE

BACKGROUND OF THE INVENTION

The present invention relates generally to gas turbine engines, and, more specifically, to turbine nozzles therein.

In a gas turbine engine, air is pressurized in a compressor and mixed with fuel in a combustor and ignited for generating hot combustion gases which flow downstream through several turbine stages. A high pressure turbine powers the compressor, and a low pressure turbine powers a fan in a typical turbofan aircraft engine application for powering an aircraft in flight.

A turbine stage includes a stationary turbine nozzle having a plurality of hollow vanes extending radially between outer and inner bands. The vanes have airfoil configurations for guiding the combustion gases between corresponding turbine rotor blades disposed downstream therefrom. The blades are mounted to the perimeter of a rotor disk which rotates during operation for providing power to turn the compressor or fan during operation.

Since the turbine nozzle vanes are heated during operation by the hot combustion gases which flow thereover, cooling air bled from the compressor is channeled inside the vanes for cooling thereof. Vane cooling is quite sophisticated and complex and many patents are found which disclose various cooling configurations.

Nozzle vanes typically include impingement baffles therein through which the cooling air is directed in impingement against the inner surface of the vane for providing internal cooling thereof. The vanes typically also include film cooling holes through the walls thereof for discharging the spent cooling air in a film over the outer surface of the vane for providing additional protection against the hot combustion gases.

The turbine nozzle is typically supported at its outer bands to a surrounding annular casing. The cooling air bled from the compressor is channeled through the casing and into the individual vanes through corresponding flowpaths. Since the turbine nozzle is directly subject to the hot combustion gases, it is heated to greater temperatures than that of the surrounding casing through which the cooling air is provided. Differential thermal expansion and contraction between the turbine nozzle and supporting casing must be accommodated for preventing unacceptably large thermal stresses during operation which would adversely affect the useful life of the nozzle.

Accordingly, a typical turbine nozzle is formed in a plurality of arcuate nozzle segments, with two or more vanes being integrally formed with corresponding outer and inner band segments, typically in unitary castings. The nozzle segments are fixedly joined to the supporting casing and include suitable seals between the adjoining band segments thereof. Segmenting the turbine nozzle interrupts the circumferential continuity thereof and permits unrestrained differential thermal movement between the nozzle and surrounding casing.

In an exemplary second stage turbine nozzle found in commercial use in this country for many years, a perforate impingement ring surrounds the nozzle outer bands for providing impingement cooling thereof. A separate .flowpath into the individual nozzle vanes is provided in this design by a plurality of inlet tubes, commonly referred to as spoolies, which extend radially between the impingement ring and the corresponding impingement baffles of the several vanes.

Each impingement baffle includes an integral inner spoolie receptacle or cup in the form of a tube fixedly joined to the top of the baffle which receives one end of the spoolie. The other end of the spoolie is received in a corresponding outer spoolie cup fixedly joined through the impingement ring.

The respective pairs of outer and inner spoolie cups are generally radially aligned with each other for receiving therebetween respective ones of the spoolies which bridge the cups and provide flow communication for channeling the cooling air into the individual vanes independently of the airflow through the impingement holes of the impingement ring.

A particular problem of this fixed-geometry spoolie design is the differential thermal expansion and contraction between the impingement ring supporting the outer ends of the spoolies and the nozzle segments from which extend the corresponding inner spoolie cups.

The circumferential positions of the inner and outer spoolie cups necessarily change from their initial cold position during assembly of the nozzle components, to their hot positions during normal operation of the engine at elevated temperature.

Accordingly, the differential thermal movement between the outer and inner spoolie cups is conventionally accommodated by introducing relatively large annular bands around both ends of the individual spoolies. The spoolie bands provide frictional seals inside the respective spoolie cups, and permit a limited amount of tilting or cocking of the individual spoolies without binding or spoolie deformation.

In this way, the outer and inner spoolie cups may be initially radially aligned during cold assembly, with the spoolies inserted therein. And at operating temperature of the turbine, the differential movement between the respective pairs of outer and inner spoolie cups is accommodated by tilting or cocking of the individual spoolies about the sealing bands thereof.

Since the spoolie bands extend radially outwardly from the outer surface of the individual spoolies, the corresponding inner diameters of the individual spoolies is inherently smaller. Since each vane requires a predetermined amount of cooling airflow therethrough for effective cooling during operation, the inner diameters of the spoolies must be suitably sized for meeting that airflow requirement. This in turn requires a correspondingly larger diameter for the spoolie bands which increases the overall size of the spoolie and supporting spoolie cups, and corresponding increases engine weight. Increased engine weight decreases overall efficiency of the engine and is a primary design objective for aircraft engines.

Since adjacent vanes in each nozzle segment are fixedly joined together by the integral band segments, they expand and contract differently than adjacent vanes in adjoining nozzle segments which are not integrally connected by the adjoining bands, but are instead joined together by the supporting casing. Differential thermal movement between the spoolie cup pairs may be otherwise accommodated by providing different positions of the inner spoolie cups for each nozzle vane. This is undesirable since it decreases nozzle segment uniformity, and increases the need for a larger inventory of parts.

Accordingly, it is desired to provide a turbine nozzle having an improved configuration of spoolies and supporting cups for accommodating differential thermal movement during operation.

BRIEF SUMMARY OF THE INVENTION

An impingement baffle for a turbine nozzle vane includes a perforate sleeve for discharging impingement air therethrough. A cap closes the sleeve at a top end, and includes an inlet hole. A spoolie cup includes a flange at the bottom thereof which is disposed atop the cap around the inlet hole for channeling air therein. A retainer is joined to the cap to loosely trap the cup flange thereatop for permitting limited lateral sliding movement thereof.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
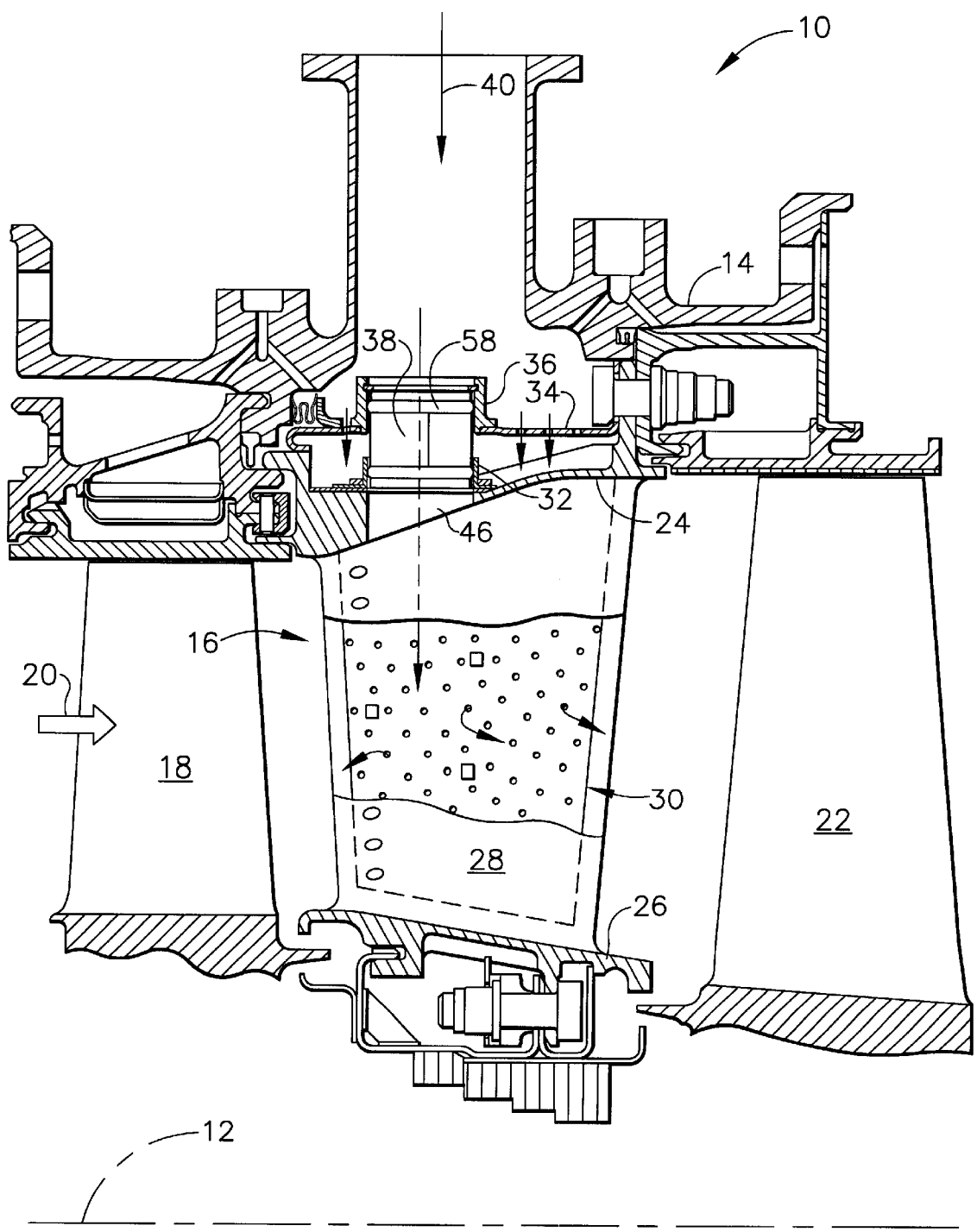
FIG. 1 is an axial sectional view of an axisymmetrical second stage turbine nozzle in accordance with an exemplary embodiment of the present invention.

Illustrated in FIG. 1 is an exemplary second stage turbine nozzle 10 of a turbofan aircraft gas turbine engine. The nozzle is axisymmetrical about a longitudinal or axial centerline axis 12 and includes an annular casing 14 from which a plurality of nozzle segments 16 are mounted in any conventional manner.

Disposed immediately upstream of the turbine nozzle is a row of high pressure turbine rotor blades 18 which first receive hot combustion gases 20 from which energy is extracted for driving the supporting turbine rotor thereof. Disposed immediately downstream of the second stage nozzle 10 is a row of second stage turbine rotor blades 22 which extract additional energy from the combustion gases for driving the supporting rotor thereof.

Figure 2:
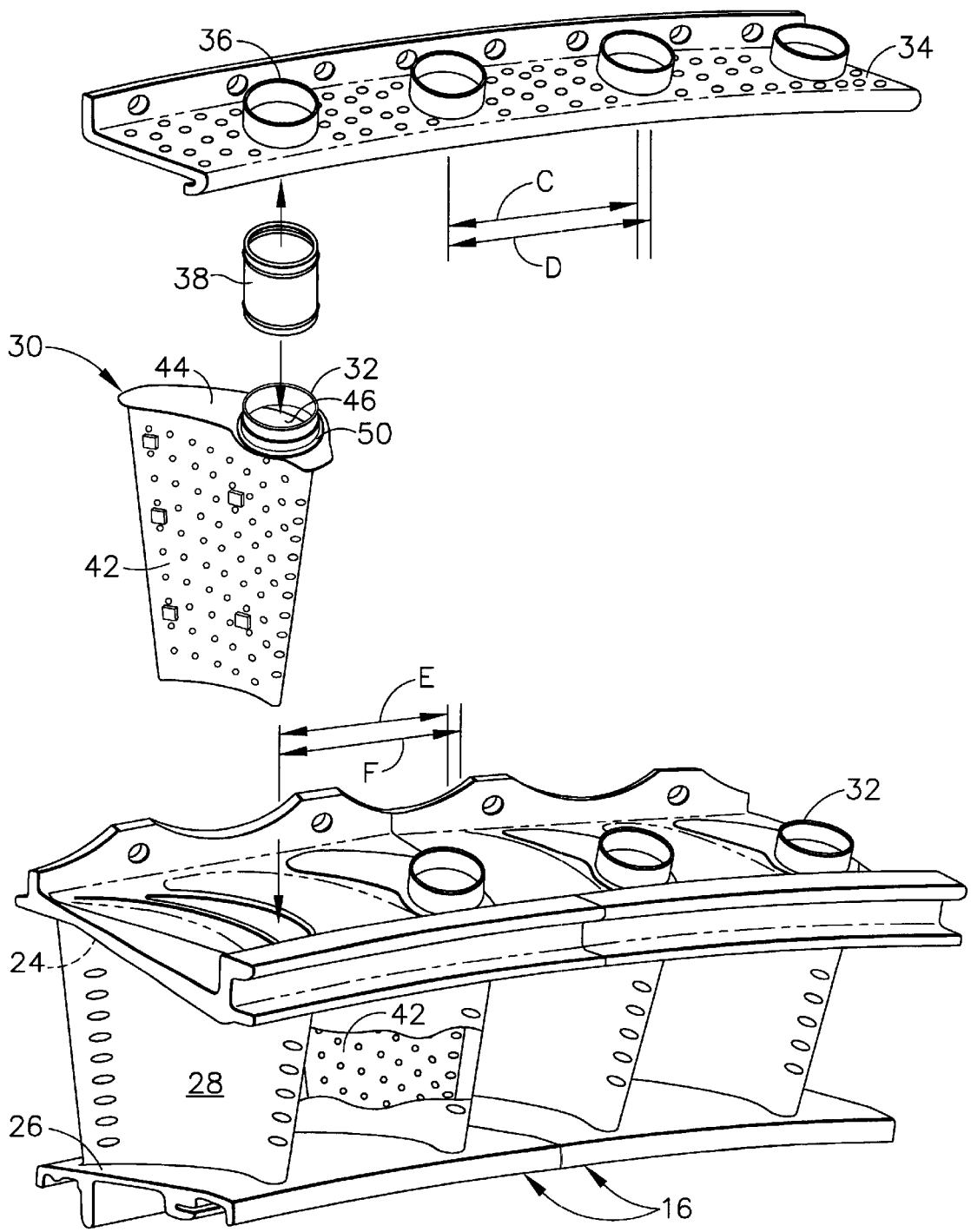
FIG. 2 is an exploded view of a portion of the turbine nozzle illustrated in FIG. 1.

FIG. 2 illustrates two of the plurality of circumferentially adjoining nozzle segments 16 in isolation from the casing 14 of FIG. 1 from which they are mounted. Each segment 16 includes radially outer and inner bands 24,26 in the form of arcuate segments integrally joined to a pair of hollow airfoil stator vanes 28, typically in a unitary one-piece casting. Two or more of the vanes may be formed in each nozzle segment and extend radially between the bands thereof, and are circumferentially spaced apart from each other for channeling the combustion gases axially therethrough.

Each of the nozzle vanes 28 illustrated in FIGS. 1 and 2 includes an impingement baffle 30 having a laterally floating inner spoolie cup 32 in the exemplary form of a short cylindrical tube extending radially outwardly from the baffle.

A perforate impingement ring 34 is conventionally mounted to the outer bands of the nozzle segments, by fasteners, radially between the supporting casing 14 and the outer bands 24 to define two concentric airflow plenums.

The impingement ring 34 includes a plurality of circumferentially spaced apart outer spoolie cups 36 which extend radially outwardly and are generally radially aligned with corresponding ones of the inner cups 32.

A plurality of spoolies 38 in the exemplary form of thin-walled sheet metal tubes are disposed through respective pairs of the aligned inner and outer cups 32,36 to form corresponding flowpath bridges therein for channeling cooling air 40 therethrough and into corresponding ones of the impingement baffles for internally cooling the respective nozzle vanes. The cooling air 40 is conventionally bled from the compressor (not shown) of the engine and channeled through inlet ports formed in the casing 14.

The impingement ring 34 illustrated in FIG. 1 includes a multitude of small impingement holes which channel a portion of the cooling air 40 through the impingement ring for impingement cooling the radially outer surface of the nozzle outer bands 24 in one cooling circuit.

A second cooling circuit is defined through the respective spoolies 38 for directly channeling the remaining portion of the cooling air 40 directly into the corresponding impingement baffles.

The impingement baffles also include a multitude of small impingement holes through the wall thereof for impingement cooling the internal surface of the vanes, with the spent vane impingement air typically being discharged from the vane through conventional film cooling holes therethrough. The spent outer band cooling air is typically discharged from the surrounding plenum through apertures in the band or through supporting mounting flanges of the outer band in a conventional manner.

Figure 3:
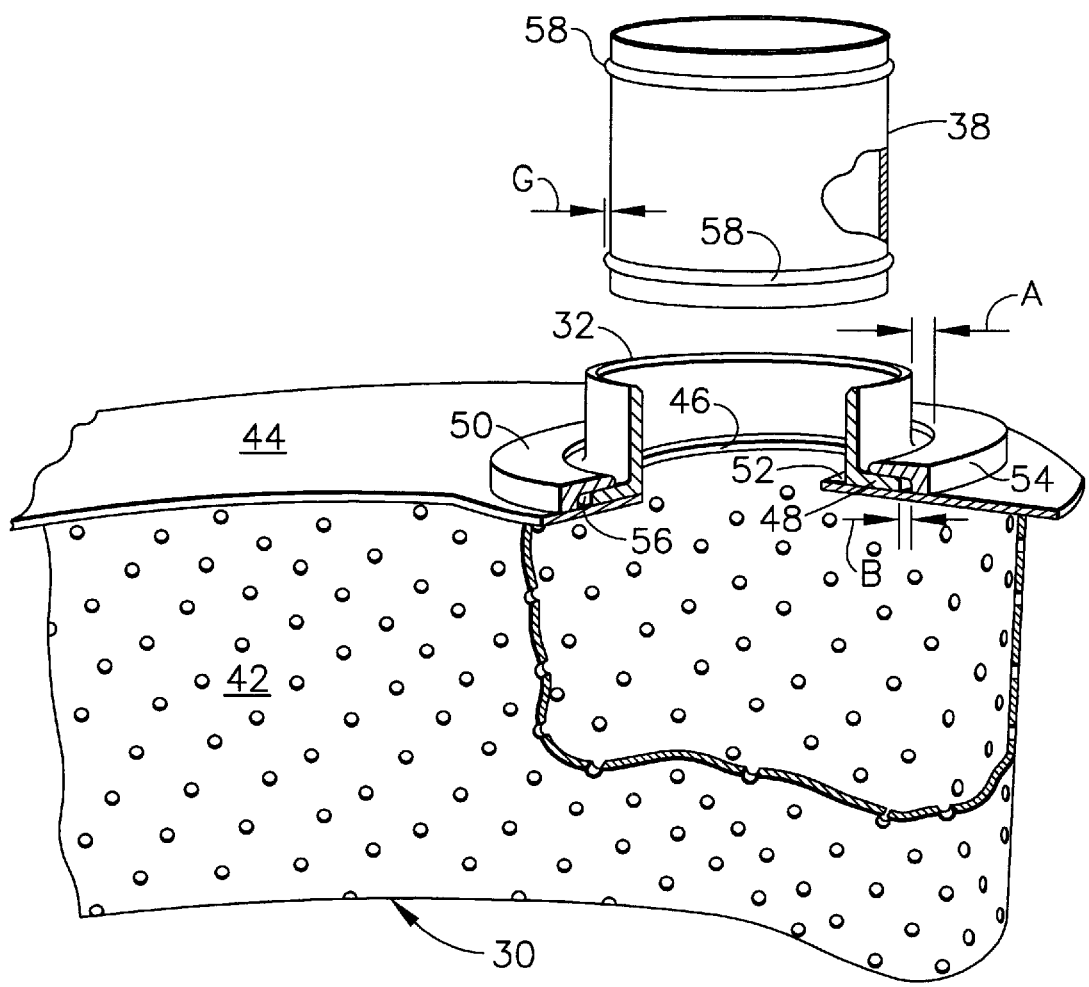
FIG. 3 is an enlarged, partly exploded, view of an exemplary impingement baffle mounted in the nozzle vanes of FIGS. 1 and 2 having a floating spoolie cup in accordance with an exemplary embodiment of the present invention.

FIG. 3 illustrates in more particularity an exemplary embodiment of the floating inner spoolie cup 32 attached to the radially outer end of an exemplary one of the impingement baffles 30. Each impingement baffle includes a perforate sleeve 42 having a multitude of small impingement holes therethrough which discharge the cooling air from inside the sleeve in impingement against the inner surface of the corresponding vane in which the baffle is mounted. The sleeve is typically a thin sheet metal member suitably closed at its radially inner end in a conventional manner, and having a thin sheet metal cap 44 closing the sleeve at its outer or top end. The cap 44 is solid or imperforate except for a large inlet hole 46 therethrough for channeling the cooling air into the baffle.

The inner spoolie cup 32 includes an integral mounting flange 48 extending radially outwardly from the circular bottom end of the cup, and is disposed or rests in direct abutting contact atop the cap 44 around the inlet hole 46.

A retainer 50 is fixedly joined to the cap to loosely trap and retain the cup flange 48 thereatop for permitting limited lateral sliding or floating movement thereof.

The cap 44 preferably further includes a flat circular seat 52 surrounding the inlet hole, and the cup flange 48 is flat to abut the flat seat and effect a contact seal therewith.

In the preferred embodiment illustrated in FIG. 3, the retainer 50 is preferably annular or circular, and is spaced radially or laterally from the inner cup 32 to define a nominal side gap A therebetween for permitting the limited lateral sliding movement of the inner cup within its retainer.

The retainer 50 also preferably includes an integral axially extending flange 54 at the perimeter thereof which is fixedly joined, by brazing or welding for example to the cap to space the retainer outwardly therefrom and define an annular slot 56 which receives and traps the cup flange 48 therein.

The retainer flange 54 is spaced laterally or radially from the cup flange 48 for defining a nominal end gap B therebetween for permitting the limited lateral sliding movement of the inner cup 32 and its mounting flange 48. The two radial gaps A,B are preferably equal for permitting the inner cup 32 to freely float or slide laterally within the limited confines of the retainer 50. The so-floating inner cup 32 provides improved radial alignment with the corresponding outer cups 36 illustrated in FIGS. 1 and 2 which improves both the initial assembly of the nozzle components, and performance of the nozzle during operation.

More specifically, the turbine nozzle is formed in a plurality of nozzle segments 16 as above described and illustrated in FIG. 2 which interrupts the circumferential continuity of the outer and inner bands. In this embodiment, the outer bands are fixedly joined together and supported from the casing 14 in a conventional manner. During operation of the turbine nozzle, the hot combustion gases 20 heat the nozzle segments to a greater operating temperature than the surrounding impingement ring 34 and casing 14 which are cooled by the bleed air 40 channeled thereto.

Since the impingement ring 34 is fully annular and is relatively cool during operation, and the nozzle segments are relatively hot during operation, these components experience differential thermal expansion as they are heated and differential contraction as they are cooled.

Accordingly, the radial alignment between the baffle inlet holes 46 and the corresponding outer spoolie cups 36 varies circumferentially during thermal expansion and contraction of the nozzle components.

The floating spoolies 32 are adjustable in lateral position within the retainers 50 so that the respective inner and outer cups 32,36 may be accurately radially aligned with each other for receiving a respective spoolie 38 therein without experiencing undesirable tilting or cocking of the spoolie upon differential thermal movement of the nozzle components.

As illustrated in FIG. 2, the two vanes of an individual nozzle segment 16 are fixedly mounted therein whereas adjacent vanes of adjoining nozzle segments are interrupted from each other by the axial splitlines therebetween. Correspondingly, the impingement ring 34 is a unitary member. The outer cups 36 must therefore be aligned with respective ones of the inner cups 32 irrespective of the differential thermal movement therebetween.

The outer cups 36 illustrated in FIG. 2 may have a nominal circumferential pitch C from center-to-center when cold, or at room temperature during assembly. As the impingement ring 34 is heated during operation, the outer cups 36 have a larger pitch D as the circumference of the ring expands.

Correspondingly, the nozzle vanes 28 and the baffle inlet holes 46 have a cold circumferential pitch E at room temperature during assembly. And, during operation at elevated temperature, the inlet holes 46 have a larger circumferential pitch F due to thermal expansion of the nozzle segments.

The respective pitches of the outer spoolie cups 36 and baffle inlet holes 46 may match either cold during assembly or hot at elevated temperature during operation, but not both.

Accordingly, the retainers 50 are preferably sized in diameter for effecting side clearances A,B which permit lateral movement of the inner spoolie cups 32 for radially aligning corresponding pairs of the inner and outer spoolie cups both during cold assembly and at a maximum operating temperature of the nozzle segments for accommodating differential thermal expansion between the impingement ring 34 and the nozzle segments 16.

A particular advantage of the floating inner spoolie cups 32 allows assembly of the respective spoolies 38 between the mating inner and outer cups during cold assembly, yet at hot temperature operation of the nozzle the inner cups may slide laterally within their retainers for maintaining radial alignment of each cup pair for limiting or preventing tilting or cocking of the respective spoolies 38. And, the floating inner cups 32 maintain the cooling air flowpath with the respective inlet holes 46 notwithstanding the pitch changes.

Particular advantages of the floating spoolie design disclosed above include the elimination of different position spoolies of fixed design for maintaining commonality of the individual nozzle segments, and thereby reducing the number of different parts required for the nozzle. And, the floating spoolies eliminate the need for relatively large positional tolerances between the pairs of inner and outer spoolie cups which would otherwise be required for a fixed geometry inner spoolie design.

As shown in FIG. 3, each of the spoolies 38 is preferably a thinwalled sheet metal tube having top and bottom, external annular bosses or bands 58 which are sized in outer diameter for frictionally abutting and engaging the corresponding inner surfaces of the inner and outer cups as illustrated in FIG. 1. In this way, the two bands 58 on each spoolie provide effective air seals thereat for ensuring that the pressurized cooling air being channeled through the spoolies into the impingement baffles experiences little if any leakage between the spoolies and the cups.

Accordingly, the spoolie bands 58 provide internal air seals within the outer and inner spoolie cups. And, the flat cup flanges 48 provide effective air seals atop the correspondingly flat seats 52 for reducing or eliminating any air leakage therethrough.

Another advantage of the floating spoolie cups 32 is that the height G of the spoolie bands 58 illustrated in FIG. 3 may be minimized from conventional spoolies used with fixed-geometry spoolie cups identified in the background section. Due to the inherent radial misalignment between fixed-geometry spoolie cups upon differential thermal movement therebetween, conventionally sized spoolie bands must be relatively high for permitting a sufficient amount of spoolie tilting or cocking around the bands to accommodate the differential thermal movement.

These large spoolie bands necessarily require a correspondingly smaller inner diameter of the spoolie. Since a specific flowrate of cooling air must be channeled through a given spoolie, the inner diameter thereof is controlled by the required flowrate, which therefore requires a correspondingly larger diameter for the spoolie bands. This in turn increases the diameter and size of the supporting fixed geometry spoolie cups, adding undesirable weight to the turbine nozzle.

However, by utilizing the floating inner spoolie cups 32, tilting or cocking of the spoolies 38 is substantially reduced or eliminated, and therefore the spoolie bands 58 may be sized with a minimum height G for effecting primarily only the desired air seals thereat without accommodation for angular cocking of the spoolies in the spoolie cups due to differential thermal expansion between the impingement ring 34 and the nozzle segments.

Since the height G of the spoolie bands may be reduced, the inner diameter of the spoolies may be correspondingly increased. In this way, for a given cooling airflow rate through the spoolie, the inner diameter required therefore may be determined, and the outer diameter of the spoolie bands 58 may be correspondingly smaller than those found in the previous design, resulting in not only a smaller spoolie, but correspondingly smaller inner and outer spoolie cups 32,36. For example, the height of the spoolie bands 58 may be reduced from about 5 mils to about 2 mils when floating spoolie cups are used to replace non-floating spoolie cups.

Accordingly, by the simple introduction of the floating spoolie cups on the respective impingement baffles, differential thermal expansion and contraction between the nozzle segments and the impingement ring 34 may be accommodated for maintaining an effectively sealed and independent flowpath for channeling the pressurized cooling air through the impingement ring into the respective impingement baffles inside the several vanes. The floating spoolies have a common or identical design, and correspondingly the nozzle segments may also have an identical design for reducing the different number of parts found in the turbine nozzle.

The floating spoolie cups may be readily formed of stamped sheet metal, for example, and readily assembled to the corresponding caps 44 of the impingement baffles in a low cost construction.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbine vane impingement baffle comprising:
   a perforate sleeve for discharging impingement air therethrough;
   a cap closing said sleeve at a top end thereof, and having an inlet hole therethrough;
   a spoolie cup including an integral flange extending radially outwardly from a bottom end thereof, and disposed atop said cap around said inlet hole for channeling air into said sleeve; and
   a retainer fixedly joined to said cap to loosely trap said cup flange thereatop for permitting limited lateral sliding movement thereof.

2. A baffle according to claim 1 wherein said cap further includes a flat seat surrounding said inlet hole, and said cup flange is flat to abut said flat seat and effect a contact seal therewith.

3. A baffle according to claim 2 wherein said retainer is annular and is spaced laterally from said cup for permitting said limited lateral sliding movement thereof.

4. A baffle according to claim 3 wherein said retainer includes an integral flange at a perimeter thereof fixedly joined to said cap to space said retainer therefrom and define an annular slot receiving said cup flange therein.

5. A baffle according to claim 4 wherein said retainer flange is spaced laterally from said cup flange for permitting said limited lateral sliding movement of said cup and flange therein.

6. A turbine nozzle comprising:
   a turbine nozzle segment including outer and inner bands integrally joined to a pair of hollow vanes extending therebetween, and each vane including an impingement baffle suspended therein, and each baffle comprising:
     a perforate sleeve for discharging impingement air therethrough;
     a cap closing said sleeve at a top end thereof, and having an inlet hole therethrough and a flat seat surrounding said inlet hole;
     an inner spoolie cup including an integral flange extending radially outwardly from a bottom end thereof, and disposed atop said cap around said inlet hole for channeling air into said sleeve, and said cup flange is flat to abut said flat seat and effect a contact seal therewith; and
     an annular retainer fixedly joined to said cap and spaced laterally from said cup to loosely trap said cup flange atop said cap for permitting limited lateral sliding movement thereof;
   a perforate impingement ring including a plurality of circumferentially spaced apart outer spoolie cups radially aligned with respective ones of said inner spoolie cups; and
   respective spoolies radially bridging corresponding pairs of said aligned inner and outer spoolie cups for channeling said air therethrough.

7. A nozzle according to claim 6 further comprising a plurality of said nozzle segments circumferentially adjoining each other, and each of said vanes thereof includes a respective one of said impingement baffles joined in flow communication with said impingement ring by corresponding ones of said spoolies bridging respective pairs of said inner and outer spoolie cups.

8. A nozzle according to claim 7 wherein said retainers are sized in diameter to permit lateral movement of said inner spoolie cups for radially aligning corresponding pairs of said inner and outer spoolie cups both during assembly and at maximum operating temperature of said nozzle segments for accommodating differential thermal expansion between said impingement ring and said nozzle segments.

9. A nozzle according to claim 6 wherein each of said spoolies includes top and bottom, external annular bands frictionally abutting inner surfaces of said inner and outer spoolie cups for providing seals thereat.

10. A nozzle according to claim 9 wherein said spoolie bands have minimum height from said spoolie for effecting primarily only said seals thereat without accommodation for angular cocking of said spoolies in said spoolie cups due to differential thermal expansion between said impingement ring and said nozzle segment.

11. A turbine nozzle comprising:
    an annular casing;
    a plurality of circumferentially adjoining nozzle segments mounted to said casing, and each segment including outer and inner bands integrally joined to a pair of hollow vanes extending therebetween;
    each of said nozzle vanes including an impingement baffle having a laterally floating inner spoolie cup extending outwardly therefrom;
    a perforate impingement ring including a plurality of circumferentially spaced apart outer spoolie cups radially aligned with respective ones of said inner spoolie cups; and
    respective spoolies radially bridging corresponding pairs of said aligned inner and outer spoolie cups for channeling cooling air therethrough.

12. A nozzle according to claim 11 wherein each of said impingement baffles further comprises:
    a perforate sleeve for discharging impingement air therethrough;
    a cap closing said sleeve at a top end thereof, and having an inlet hole therethrough;
    said inner spoolie cup including an integral flange extending radially outwardly from a bottom end thereof, and disposed atop said cap around said inlet hole for channeling air into said sleeve; and
    a retainer fixedly joined to said cap to loosely trap said cup flange thereatop for permitting limited lateral sliding movement thereof.

13. A nozzle according to claim 12 wherein each of said caps further includes a flat seat surrounding said inlet hole, and said cup flange is flat to abut said flat seat and effect a contact seal therewith.

14. A nozzle according to claim 13 wherein each of said retainers is annular and is spaced laterally from said cup for permitting said limited lateral sliding movement thereof.

15. A nozzle according to claim 14 wherein each of said retainers includes an integral flange at a perimeter thereof fixedly joined to said cap to space said retainer therefrom and define an annular slot receiving said cup flange therein.

16. A nozzle according to claim 15 wherein each of said retainer flanges is spaced laterally from said cup flange for permitting said limited lateral sliding movement of said cup and flange therein.

17. A nozzle according to claim 16 wherein said retainers are sized in diameter to permit lateral movement of said inner spoolie cups for radially aligning corresponding pairs of said inner and outer spoolie cups both during assembly and at maximum operating temperature of said nozzle segments for accommodating differential thermal expansion between said impingement ring and said nozzle segments.

18. A nozzle according to claim 17 wherein each of said spoolies includes top and bottom, external annular bands frictionally abutting inner surfaces of said inner and outer spoolie cups for providing seals thereat.

19. A nozzle according to claim 18 wherein said spoolie bands have minimum height from said spoolie for effecting primarily only said seals thereat without accommodation for angular cocking of said spoolies in said spoolie cups due to differential thermal expansion between said impingement ring and said nozzle segment.

* * * * *